(12) United States Patent
Becker et al.

(10) Patent No.: US 7,579,727 B2
(45) Date of Patent: Aug. 25, 2009

(54) CONNECTOR PIECE FOR A FUEL PUMP

(75) Inventors: Dirk Becker, Alheim (DE); Ralf Muehlhausen, Rotenburg (DE); Frank-William Ries, Bad Hersfeld (DE); Thomas Schmidt, Hauneck (DE)

(73) Assignee: Siemens Aktiengesellschaft, Munich (DE)

( * ) Notice: Subject to any disclaimer, the term of this patent is extended or adjusted under 35 U.S.C. 154(b) by 628 days.

(21) Appl. No.: 10/508,230

(22) PCT Filed: Mar. 17, 2003

(86) PCT No.: PCT/DE03/00853

§ 371 (c)(1),
(2), (4) Date: Apr. 6, 2005

(87) PCT Pub. No.: WO03/081016

PCT Pub. Date: Oct. 2, 2003

(65) Prior Publication Data

US 2005/0163636 A1    Jul. 28, 2005

(30) Foreign Application Priority Data

Mar. 27, 2002    (DE)  ............................... 102 13 995

(51) Int. Cl.
     *F04B 17/00*      (2006.01)
     *F04B 35/04*      (2006.01)
     *H02K 5/00*      (2006.01)
(52) U.S. Cl. .................. 310/71; 310/87; 417/423.3; 417/423.14; 417/423.11; 417/423.9; 417/572
(58) Field of Classification Search .................. 310/51, 310/71, 87; 417/423.7, 423.3, 423.14, 423.11, 417/423.9; 439/519
See application file for complete search history.

(56) References Cited

U.S. PATENT DOCUMENTS

| | | | | |
|---|---|---|---|---|
| 2,624,286 A | * | 1/1953 | Smith | 417/422 |
| 4,513,215 A | * | 4/1985 | Del Serra | 310/90 |
| 4,726,746 A | * | 2/1988 | Takada et al. | 417/423.1 |
| 5,002,467 A | * | 3/1991 | Talaski et al. | 417/363 |
| 5,013,221 A | * | 5/1991 | Tuckey | 417/365 |
| 5,141,410 A | * | 8/1992 | Fujii | 417/423.7 |

(Continued)

FOREIGN PATENT DOCUMENTS

DE      36 44 307 A1      7/1988

(Continued)

OTHER PUBLICATIONS

DE199 21 539_EN.pdf: Zoell et al (DE199 21 539 (English translation).*

*Primary Examiner*—Burton Mullins
*Assistant Examiner*—John K Kim
(74) *Attorney, Agent, or Firm*—Cohen Pontani Lieberman & Pavane LLP

(57) ABSTRACT

In the case of a fuel pump, a plug for fixing electric contacts is manufactured from a material which is capable of swelling with fuel, and is inserted into a receptacle of a connecting piece by being fitted therein. Furthermore, the plug and the connecting piece have latching means for simplifying the pre-assembly. The connecting piece requires a particularly low number of components and can be manufactured cost-effectively.

13 Claims, 2 Drawing Sheets

U.S. PATENT DOCUMENTS

| | | | | |
|---|---|---|---|---|
| 5,189,328 | A | * | 2/1993 | Knox .......................... 310/90 |
| 5,191,173 | A | * | 3/1993 | Sizer et al. .............. 174/105 R |
| 5,345,124 | A | * | 9/1994 | Lang .......................... 310/51 |
| 5,582,510 | A | * | 12/1996 | Dobler et al. ............ 417/423.7 |
| 5,645,026 | A | * | 7/1997 | Schlessmann .......... 123/184.46 |
| 5,669,763 | A | * | 9/1997 | Pryce et al. ................. 417/313 |
| 5,734,212 | A | * | 3/1998 | Uffelman .................... 310/51 |
| 6,422,839 | B1 | * | 7/2002 | Brockner et al. ......... 417/423.7 |
| 6,478,613 | B1 | * | 11/2002 | Zoell et al. ................. 439/519 |
| 6,652,249 | B2 | * | 11/2003 | Kenney et al. ........... 417/410.3 |
| 6,783,336 | B2 | * | 8/2004 | Kempfer et al. .......... 417/423.1 |
| 6,824,366 | B2 | * | 11/2004 | Nagasaka et al. ........ 417/423.1 |
| 2002/0180301 | A1 | * | 12/2002 | Ebihara ...................... 310/239 |
| 2004/0001769 | A1 | * | 1/2004 | Kempfer et al. .......... 417/423.1 |
| 2004/0150280 | A1 | * | 8/2004 | Moroto et al. ......... 310/154.28 |
| 2005/0287023 | A1 | * | 12/2005 | Schmidt .................. 417/423.7 |

FOREIGN PATENT DOCUMENTS

| | | |
|---|---|---|
| DE | 91 00 353.9 U | 4/1991 |
| DE | 42 26 267 A1 | 2/1994 |
| DE | 197 22 132 A1 | 12/1998 |
| DE | 199 21 539 A1 | 11/2000 |
| EP | 0 582 949 A2 | 8/1993 |
| WO | WO00/68561 | * 11/2000 |

* cited by examiner

CONNECTOR PIECE FOR A FUEL PUMP

BACKGROUND OF THE INVENTION

1. Field of the Invention

The invention relates to a connecting piece for a fuel pump having a receptacle for a plug with electric contacts for connection of an electric motor of the fuel pump to an electric network.

2. Background of the Related Art

Connecting pieces of this type are used in fuel pumps of motor vehicles nowadays for closing off a common housing of the electric motor and of a pump stage, and are known from practice. For installation purposes, the electric contacts are guided through the sealing lips provided in the connecting piece and held in place. This makes it possible for the feed pressure produced by the fuel pump to be withstood by the connecting piece and to be fed to a connector of a supply line. A disadvantage of the known connecting piece is that it is complicated to fit. In addition, the plastic connecting piece may be damaged during installation of the electric contacts.

Furthermore, a connecting piece has been known from practice, in which the plug is encapsulated by the plastic of the connecting piece. This likewise requires very complicated manufacturing of the connecting piece.

The invention is based on the object of designing a connecting piece of the type mentioned at the beginning in such a manner that it is particularly simple to manufacture and to fit.

SUMMARY OF THE INVENTION

This object is solved according to the invention by the plug and/or the connecting piece being manufactured in their/its adjacent regions from a material which is capable of swelling with fuel, and by, in the swollen state, subregions of the plug and of the receptacle bearing directly against one another in a sealing manner.

This design means that the connecting piece according to the invention requires neither a sealing ring for sealing the plug nor an encapsulation of the plug in order to seal it relative to adjacent components of the connecting piece according to the invention. The connecting piece according to the invention can therefore be manufactured particularly simply, effectively avoiding damage in the region of the sealing surfaces.

A contribution is made to the further simplification of the manufacturing of the connecting piece according to the invention if the plug has an encircling edge and is arranged in a recess of the receptacle with a transition or press fit.

According to another advantageous development of the invention, the installation in advance of the plug in the receptacle before swelling of the plastic turns out to be particularly simple if the receptacle and the plug have latching means corresponding with one another. The latching means therefore serve as an installation aid for the plug.

Since, when the connecting piece according to the invention is fitted on the fuel pump, the pressure of the fuel acts on the plug exclusively from one side, reliable tightness of the plug relative to the receptacle can be ensured in a simple manner if sealing surfaces of the plug and of the receptacle are designed to be substantially planar or funnel-shaped. With a suitable arrangement of the sealing surfaces, the prestress of the plug against the receptacle increases with increasing pressure within the fuel pump.

The connecting piece known from practice has an inserted metal bearing bushing for the mounting of a shaft of the electric motor of the fuel pump. However, a contribution is made to the further simplification of the installation of the connecting piece according to the invention if a cup-shaped recess designed as a bearing lug for the direct mounting of a shaft of the electric motor is arranged next to the receptacle. This means that the insertion and fixing of a separately manufactured bearing bushing into the connecting piece according to the invention is no longer required.

A multiplicity of components can be integrated in the connecting piece according to the invention in a simple manner if two guides for brushes of the electric motor, which brushes are connected to the plug, are arranged next to the receptacle.

The connecting piece according to the invention can be manufactured particularly cost-effectively from plastic by injection molding and can be removed axially from the injection mold in a simple manner if the receptacle, the guides and the cup-shaped recess are arranged parallel to one another.

According to another advantageous development of the invention, corrosion of connections of electric lines can be reliably avoided if the plug has a plastic casing, and if the plastic casing surrounds connections of the electric contacts to lines leading to the brushes.

Electrostatic charging of the connecting piece according to the invention can be avoided with a particularly low structural outlay if a ground conductor protruding from the plug is guided as far as a lower edge of the connecting piece, which edge is provided for connection to a housing of the electric motor.

BRIEF DESCRIPTION OF THE DRAWINGS

The invention permits numerous embodiments. To further clarify its basic principle one of these is illustrated in the drawing and will be described below. In the drawing

DETAILED DESCRIPTION OF THE DRAWINGS

Figure 1:
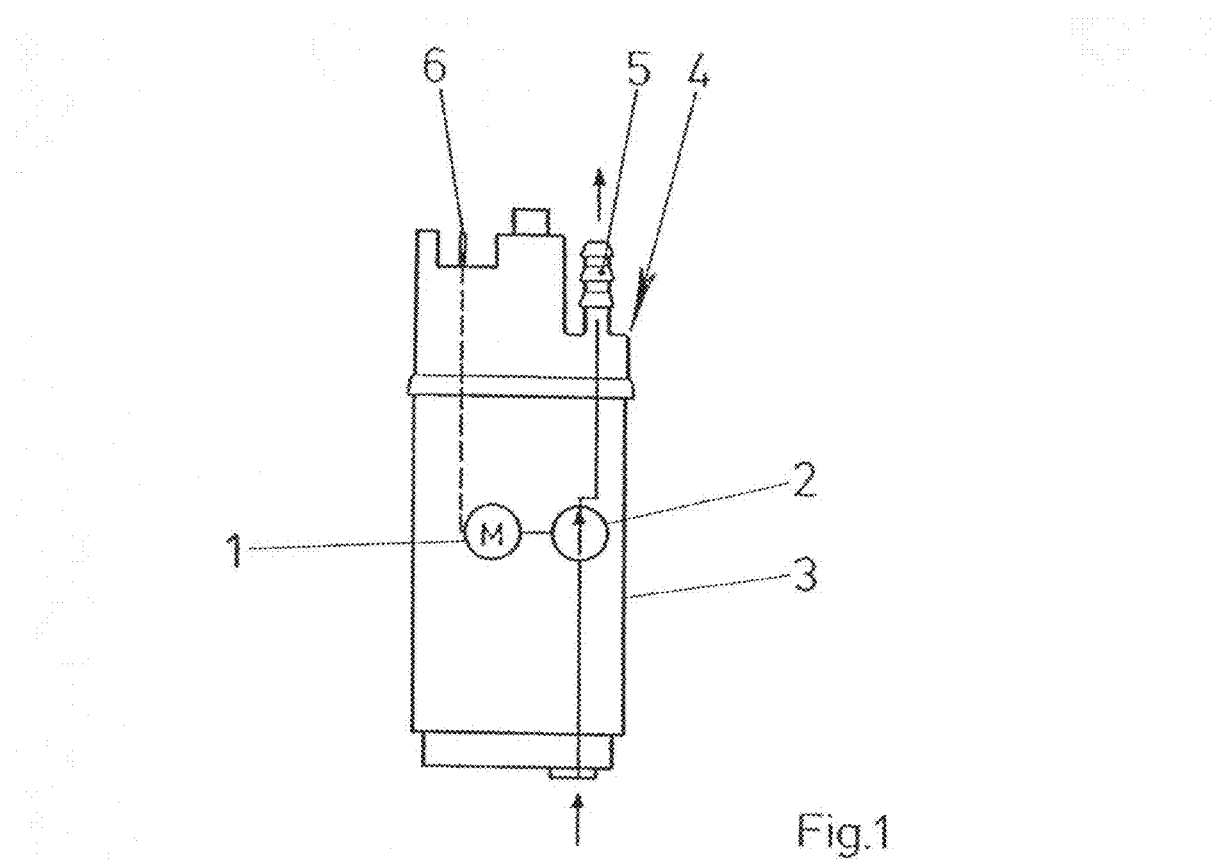
FIG. 1 shows, diagrammatically, a fuel pump having a connecting piece according to the invention.

FIG. 1 shows a fuel pump of a motor vehicle with a pump stage 2, which is driven by an electric motor 1, and with a connecting piece 4, which is fixed on a housing 3. The connecting piece 4 has a connector 5 for a supply line leading to an internal combustion engine of the motor vehicle. Furthermore, the connecting piece 4 has electric contacts 6 for the electric motor 1 of the fuel pump.

Figure 2:
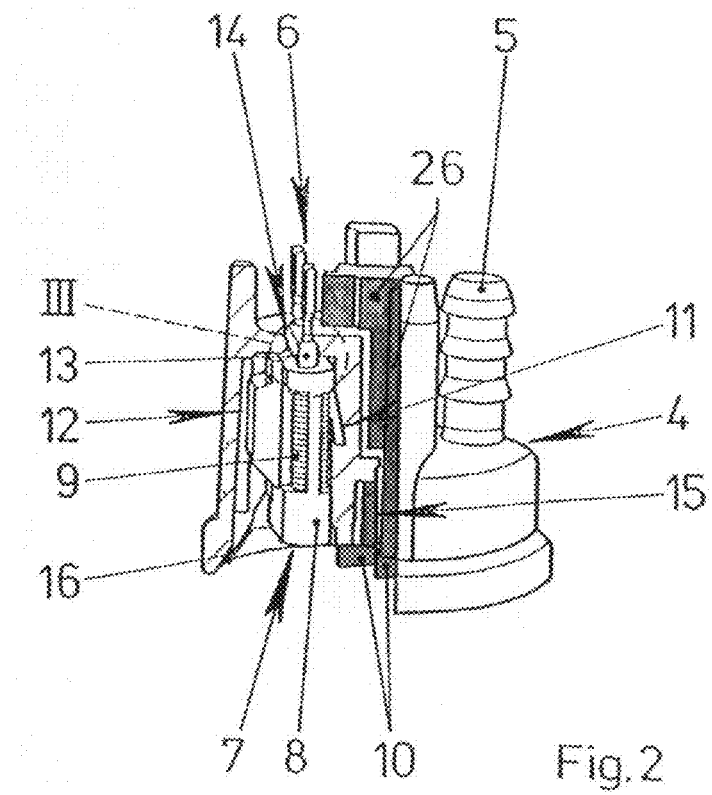
FIG. 2 shows the connecting piece according to the invention from FIG. 1, in a subsection.

FIG. 2 shows the connecting piece 4 from FIG. 1 in an enlarged subsection. The electric contacts 6 are arranged on a plug 7. The plug 7 has a plastic casing 8 with inductance coils 9 protruding out of it and with two brushes 10 for a collector of the electric motor 1 from FIG. 1. The brushes 10 are guided in elongate guides 26 of the connecting piece 4 and are prestressed in the direction of the electric motor 1 (illustrated in FIG. 1) by means of a spring element. The plug 7 is held in a receptacle 12 of the connecting piece 4 by latching means 11 and, with an edge 13, penetrates a recess 14 of the connecting piece 4. Furthermore, the connecting piece 4 has, in its center, a cup-shaped recess 15 for the direct mounting of a shaft of the electric motor 1. A ground conductor 16 is guided from the plug 7 as far as the lower edge of the connecting piece 4.

Figure 3:
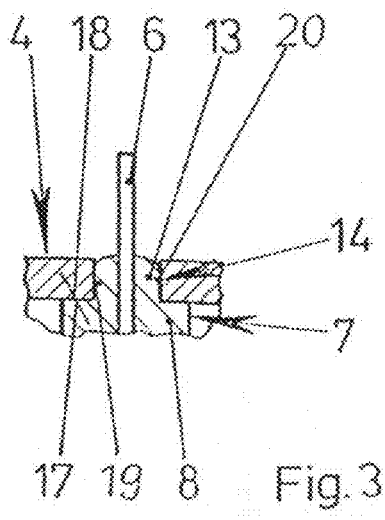
FIG. 3 shows a greatly enlarged illustration of a detail III of the connecting piece according to the invention from FIG. 1.

FIG. 3 shows the region of the edge 13 of the plug 7 and the recess 14 of the connecting piece 4 on a greatly enlarged scale. It can be seen here that the plastic casing 8 of the plug 7 is directly in contact with the connecting piece 4. In addition, the edge 13 and the recess 14 are surrounded by planar sealing surfaces 17, 18, 19 of the plug 7 and of the connecting piece 4. During feeding of fuel by the fuel pump illustrated in FIG. 1, there is produced within the housing 3 an excess pressure which acts on the plug 7 and prestresses the sealing surfaces 17, 18 against each other.

The edge 13 of the plug 7 and the connecting piece 4 are manufactured from a plastic which is capable of swelling with fuel, and have a transition fit or a press fit. For installation purposes, the plug 7 is thus introduced into the reception 12 of the connecting piece 4 until the latching means 11 hold the plug 7 in its position. In the process, the edge 13 of the plug 7 passes into the recess 14 of the connecting piece 4. On contact with fuel, edge 13 and the recess 14 swell and thus seal the plug 7 relative to the connecting piece 4.

Figure 4:
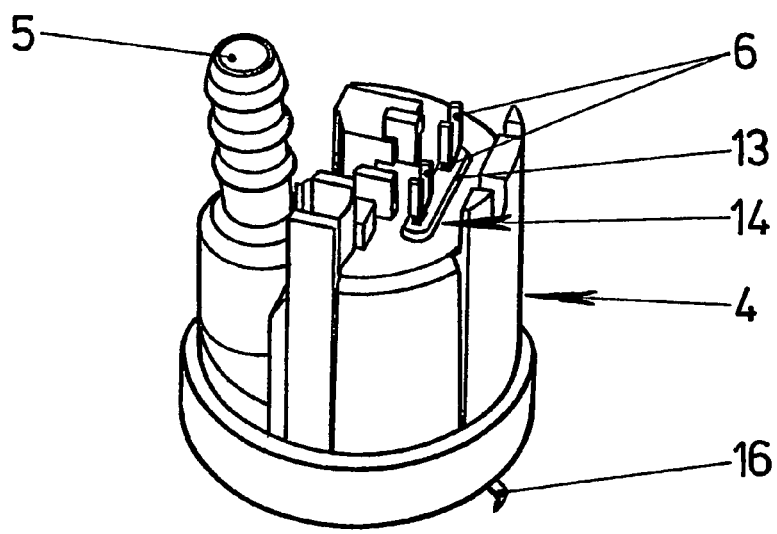
FIG. 4 shows a perspective illustration of the connecting piece from FIG. 1.

FIG. 4 shows a perspective illustration of the connecting piece 4 from FIG. 1. Here, it is should be appreciated that the edge 13 encloses both of the contacts 6. As a result, the recess 14 in the connecting piece 4, which is adjacent to the receptacle of the edge 13, is arranged within an oblong or rectangular shaped perimeter.

Figure 5:
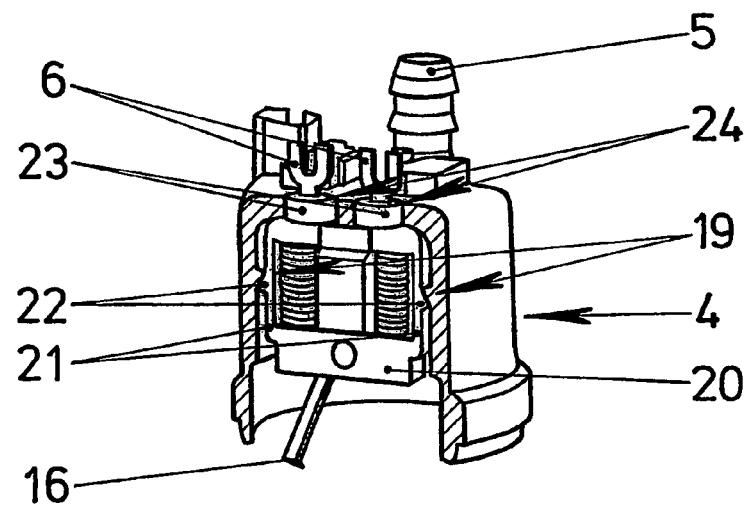
FIG. 5 shows a cross-sectional view of an additional embodiment of the terminal piece according to invention.

FIG. 5 is an additional embodiment of the connecting piece 4 in accordance with the invention. Here, the plastic casing of the plug is comprised of individual casings 23 that surround a respective electrical contact 6. Here, each recess 24 is surrounded by planar sealing surfaces 19, 20, 21 and 22 of the plug 7 and of the connecting piece 4. During feeding of fuel by the fuel pump illustrated in FIG. 1, there is produced within the housing 3 an excess pressure which acts on the plug 7 and prestresses the sealing surfaces 19, 20, 21 and 22 against each other.

Figure 6:
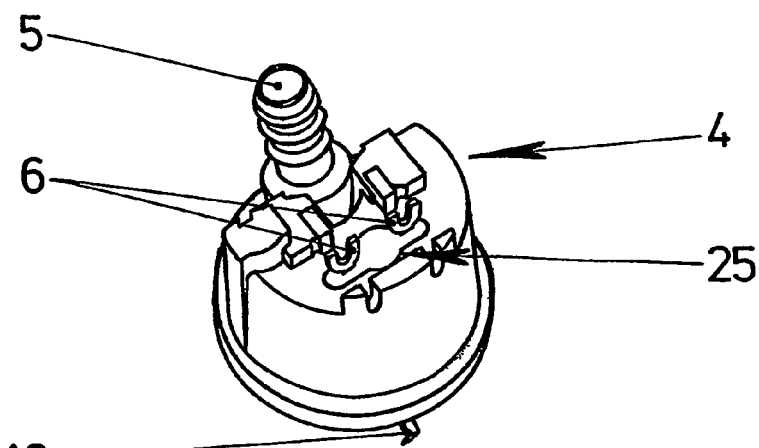
FIG. 6 shows a perspective illustration of an additional embodiment of the connecting piece in accordance with the invention.

FIG. 6 shows a perspective illustration of a further embodiment of the connecting piece 4 in accordance with the invention. Here, it should be appreciated that the recess has been eliminated and the plastic casing of the plug is arranged such that it is flush with the surface of the connecting piece 4.

What is claimed is:

1. A connecting piece for a fuel pump comprising:
a receptacle for a plug, the plug having electric contacts for connection of an electric motor of the fuel pump to an electric network and a casing surrounding the electrical contacts; wherein the plug or the connecting piece is configured to swell with fuel in a region in which the casing and the connecting piece are adjacent; and sealing surfaces of the plug and the receptacle bear directly against one another in a sealing manner in said adjacent region.

2. The connecting piece as claimed in claim 1, wherein the plug comprises an encircling edge and is arranged with a transition or press fit in a recess of the receptacle.

3. The connecting piece as claimed in claim 1, wherein the receptacle and the plug are engaged in a latching relationship.

4. The connecting piece as claimed in claim 1, wherein the sealing surfaces of the plug and of the receptacle are substantially planar or funnel-shaped.

5. The connecting piece as claimed in claim 1, further comprising a cup-shaped recess arranged next to the receptacle to act as a bearing lug for the direct mounting of a shaft of the electric motor.

6. The connecting piece as claimed in claim 1, further comprising two guides for brushes of the electric motor, wherein the brushes are connected to the plug and are arranged next to the receptacle.

7. The connecting piece as claimed in claim 5, further comprising two guides for brushes of the electric motor, wherein the brushes are connected to the plug and are arranged next to the receptacle.

8. The connecting piece as claimed claim 6, wherein the casing is a plastic casing arranged to surround connections of the electric contacts to lines leading to the brushes.

9. The connecting piece as claimed in claim 1, wherein the plug further comprises a ground conductor protruding therefrom and guided as far as a lower edge of the connecting piece, which edge is provided for connection to a housing of the electric motor.

10. The connecting piece as claimed in claim 7, wherein the receptacle, the guides and the cup-shaped recess are arranged parallel to one another.

11. A connecting piece for a fuel pump comprising:
a receptacle for a plug, the plastic plug having electric contacts for connection of an electric motor of the fuel pump to an electric network and a casing surrounding the electrical contacts; wherein the plug or the connecting piece is manufacture from a plastic which is configured to swell with fuel in a region in which the casing and the connecting piece are adjacent; and sealing surfaces of the plug and the receptacle bear directly against one another in a sealing manner in said adjacent region.

12. A combination comprising a connecting piece for a fuel pump and a plug,
the connecting piece configured to form a receptacle for receiving the plug, the plug having electric contacts for connection of an electric motor of the fuel pump to an electric network and a casing surrounding the electrical contacts, the casing being surrounded by a recess of the receptacle when the plug is received in the receptacle, the casing and the recess having mutually opposing sealing surfaces, at least one of the plug or the connecting piece being manufactured from a material configured to swell with fuel in an adjacent region of the recess in which the casing and the connecting piece are adjacent so that sealing surfaces bear directly and sealingly against one another in said adjacent region when the at least one of the plug of the connecting piece swell with fuel.

13. The combination of claim 11, wherein the material configured to swell is a plastic.

* * * * *